United States Patent

Modrey

[15] 3,668,968

[45] June 13, 1972

[54] EXPANSION FASTENER

[72] Inventor: Henry J. Modrey, Eagle Drive, Stamford, Conn. 06903

[22] Filed: April 14, 1970

[21] Appl. No.: 28,412

[52] U.S. Cl. .................................................. 85/83, 85/85
[51] Int. Cl. ............................................................ F16b 13/06
[58] Field of Search ..................... 85/85, 83, 84, 82, 64, 88

[56] References Cited

UNITED STATES PATENTS

| | | | |
|---|---|---|---|
| 1,114,971 | 10/1914 | Diefendorf | 85/85 |
| 3,136,202 | 6/1964 | Wagner | 85/85 |
| 1,410,259 | 3/1922 | Kennedy | 85/85 |
| 3,461,772 | 8/1969 | Barry | 85/84 |

FOREIGN PATENTS OR APPLICATIONS

| | | | |
|---|---|---|---|
| 262,891 | 12/1926 | Great Britain | 85/85 |
| 279,985 | 11/1964 | Australia | 85/85 |
| 471,744 | 2/1929 | Germany | 85/85 |

*Primary Examiner*—Edward C. Allen
*Attorney*—Hane, Baxley & Spiecens

[57] ABSTRACT

The fastener has a spirally wound anchor sleeve which is circumferentially expanded within its mounting hole by inserting into the sleeve an anchor bolt or screw having a cross-section larger than the initial internal peripheral outline of the sleeve thereby locking the sleeve to the surrounding wall material. Initial grip of the sleeve in the mounting hole is provided and locking is further strengthened by providing on the outside of the sleeve teeth which bite into the wall material when the sleeve is inserted and expanded.

6 Claims, 8 Drawing Figures

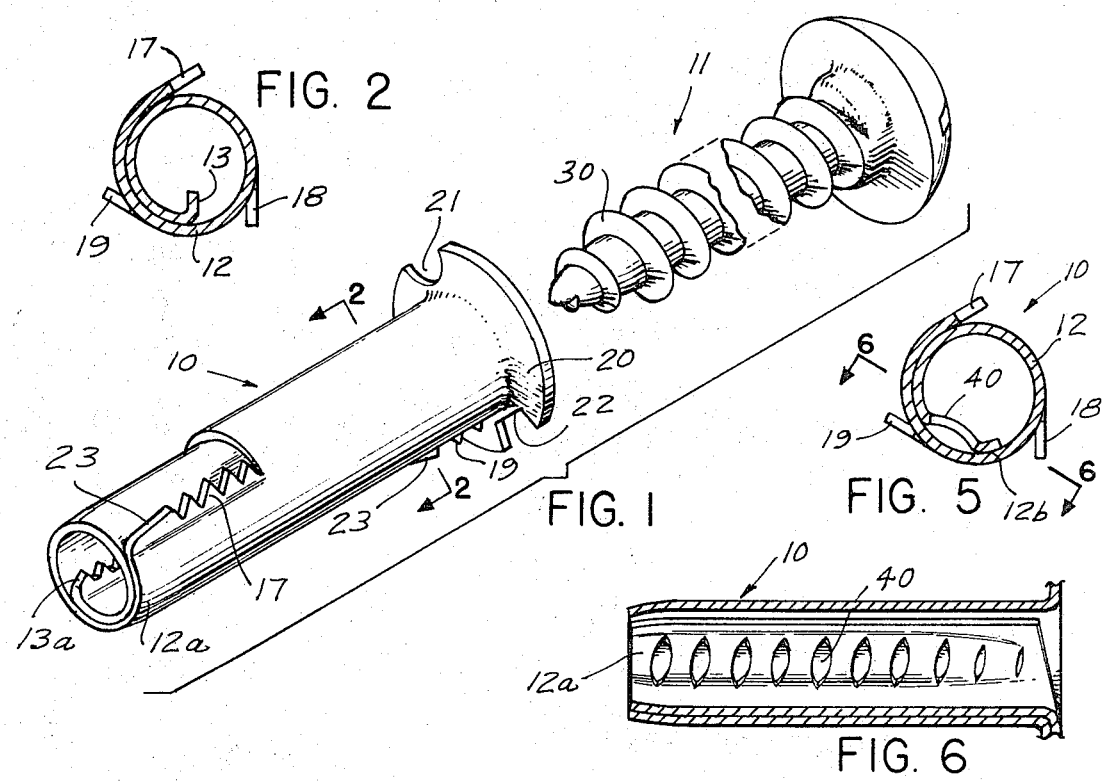
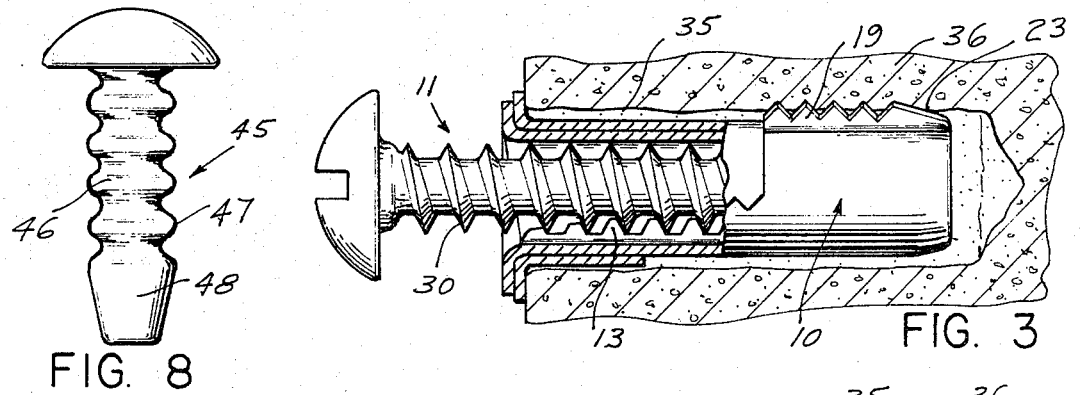
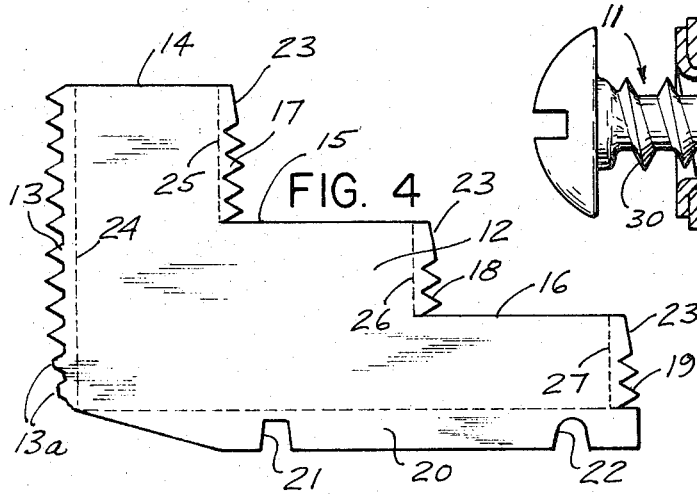
INVENTOR.
HENRY J. MODREY

EXPANSION FASTENER

The present invention is a triple-purpose fastener. In the first place, it relates to wall anchors mounted by insertion into a blind mounting hole in masonry. Secondly, it relates to hollow wall anchors mounted by insertion in a hole in a comparatively thin wall panel. Thirdly, it relates to thread inserts, mounted by force-fit insertion in a hole in plastic or wood.

BACKGROUND

The three types of fasteners above referred to operate in two phases. In the first phase, the inserted device must be held sufficiently tight to withstand the turning torque of the coacting bolt or screw, without rotating in its hole. In the second phase, the fastener is expanded by the action of the bolt or screw. If the "initial grip" is insufficient, the fastener will idle in its hole without being able to expand.

In the most primitive and least satisfactory form of wall anchor, initial grip is achieved by driving an oversized sleeve tightly into the mounting hole. Such wall anchors are generally made from plastic, fiber or lead and are acceptable only for simple fastening operations, because they tend to idle without gripping, or alternatively to crack or split during the expansion phase.

Wall anchors used for industrial purposes and increasingly for domestic applications, are far more complex than the aforementioned simple expansion sleeves. Generally, they fit with comparative ease into their mounting holes and effect expansion by the screw-actuated withdrawal of one or several axially movable parts which open a cone or spread locking members. Such expansion bolts or shields are in widespread industrial use. Due to their complexity, they are expensive. They also require strict adherence to the prescribed installation method, as regards hole diameter and depth, and as regards the initial grip phase of the tightening process. This is a serious consideration in building operations since there is no exterior indication or means for checking whether a bolt has gripped properly and is therefore exercising its full strength.

Hollow wall anchors are likewise structurally complex. Following insertion, the anchor must be "set" by expanding and deforming several arms until they bear against the backside of the wall panel. The user must exercise considerable force with the screwdriver to deform these metal parts which makes the operation slow and tiresome. The torque required for setting is so high that the head of the inserted fastener must often be held stationary by a wrench or another tool. Since there is no distinct stop in this tightening operation, the user may easily leave the arms insufficiently deformed, which results in a loose fastener. Alternatively, if the tightening is overdone, the expanded arms may be pulled through the plasterboard, cutting a large hole. Apart from these operational features, hollow wall anchors have the disadvantage that their length must correspond quite precisely to the thickness of the wall panel, so that the expansion arms can fold against the rear of the panel. These fasteners are therefore made in 8–10 different lengths which complicates merchandising as well as use. The user is frequently unaware of the precise thickness of the wallboard.

Thread inserts are used for providing screw threads in plastic parts. In mass production, the use of such inserts is generally more economical than providing molded or tapped threads, or using threaded metal bushings which are molded into the plastic. Thread inserts are generally machined brass bushings. The conical tip of the bushing is knurled outside and threaded inside, and has several slots. The inserts are force-fitted into the mounting holes. The force-fit is sufficiently tight to provide the required initial grip, without however breaking the plastic wall surrounding the hole. When the coacting screw is tightened, it spreads the slotted section of the conical tip and seats the insert firmly in the bore. These inserts must be very short since molded blind holes in plastic are always kept as shallow as possible. Their length corresponds generally to the number of screw threads required for holding the screw. This requirement excludes all presently known wall anchors from this particular application, even if they could be reduced to the required small diameter, since they require considerable axial length for actuation of their expansion members.

THE INVENTION

It is an object of the invention to provide a novel and improved fastener, formed from a single piece of material, which can effectively fulfill the functions of each of the three general types of fasteners above referred to, which can be rapidly installed in a mounting hole, and which automatically provides initial starting grip as well as security against rotation and vibration. The advantages of a fastener capable of fulfilling the functions of three hitherto separate types of fasteners, are self-evident. So are the advantages of a single-piece fastener made by presswork in replacing machined fasteners or fasteners consisting of several parts.

Another object of the invention is to provide a novel and improved one-piece fastener consisting of a sleeve with one or several tangential projections or wings which fold back when the sleeve is driven into a tight hole in hard material or when it is twisted counter-clockwise, but which resist torque applied to said sleeve in clockwise direction by means of the coacting screw or bolt. Said tangential projections or wings therefore automatically provide the initial grip required for starting the expansion process, reinforce the locking action of the expanded fastener sleeve by digging into the hole wall, make the fastener adaptable for oversized holes, make the fastener operative in powdery or brittle materials by forming an undercut, and make it possible to remove an installed fastener. The advantage of the fastener consists in the automatic provision of starting grip which avoids faulty installation, and in its adaptability to oversized or irregular holes. In building operations, it is difficult to provide uniform holes in masonry, quite especially if rotary drills are not percussion drills are used. The advantage of the fastener is that it does not require strict observance of installation instructions and tolerances.

Another object of the invention is to provide a novel and improved fastener, the sleeve of which consists of several turns of springy material which are circumferentially expanded over their entire length, by insertion of a suitably dimensioned screw or similar member into the sleeve so that the outer wall of the sleeve locks itself to the surrounding wall material. The advantage of the fastener resides in the true circular expansion of the sleeve over substantially its entire length which creates optimum conditions for secure locking. As a result, the fastener sleeve can be made small and short enough to serve as a thread insert in plastic materials. Since the expansion is circular and uniform, the fastener will lock in thin-walled brittle material without cracking the surrounding wall.

Another object of the invention is to provide a novel and improved fastener, the sleeve of which has incomplete inside threads, formed by a row of teeth or one or several rows of spaced slots at its inside wall, for engagement with threads or peripheral ridges on the anchor bolt or screw when this is inserted into the sleeve, thereby securing the bolt or screw in the sleeve. The advantage of the fastener lies in the provision of threads which are made by presswork and therefore considerably more economical to produce than the machined threads which are generally used in most fasteners of the types above referred to, with the exception of the simple expansion sleeves which have no inside threads.

A still further object of the invention is to provide a novel and improved fastener with a springy sleeve which provides intense spring pressure upon the entire length of the inserted anchor bolt or screw, thus securing said bolt or screw against involuntary loosening, especially under the influence of vibration and shock. Provision of integral anti-vibration means is of advantage in any type of fastener. This applies especially to fasteners used in construction work which tend to loosen as a result of the continuous vibrations caused by vehicular traffic.

SUMMARY OF THE INVENTION

The aforepointed out objects, features and advantages, and other objects, features and advantages which will be pointed out hereinafter, are obtained by providing a spirally wound sleeve form consisting of several turns of springy material which is circumferentially expanded over substantially its entire length by inserting into the sleeve an anchor bolt or screw or similar member having a larger maximal cross-section than the initial internal peripheral outline of the sleeve. As a result of such expansion of the sleeve, the outer wall thereof over its entire length is tightly pressed against the wall of a mounting hole into which the sleeve is inserted. Initial grip is obtained and anchorage of the sleeve in its mounting hole is further strengthened by providing on the outside of the sleeve tangential protrusions which counteract the limited expansion torque and bite into the surrounding wall material when the sleeve is expanded.

DETAILED DESCRIPTION OF THE INVENTION

In the drawing:

FIG. 1 is a perspective exploded view of a fastener according to the invention;

FIG. 2 is a section taken on line 2—2 of FIG. 1;

FIG. 3 is a view, partly in section, of the fastener according to FIG. 1 installed in a blind mounting hole;

FIG. 4 is a plan view of a blank for forming the fastener sleeve of FIG. 1;

FIG. 5 is a cross-section of a modified fastener sleeve;

FIG. 6 is a section taken on line 6—6 of FIG. 5;

FIG. 7 is a sectional view of the sleeve of FIGS. 5 and 6 locked in a mounting hole and of an anchor screw threaded into the sleeve; and FIG. 8 is a view of a modified anchor bolt suitable for insertion by hammer blows into any of the sleeves shown in FIGS. 1 to 7.

Referring first to FIGS. 1 to 4, the fastener exemplified in these figures comprises a sleeve 10 and an anchor bolt 11 shown as a coarsely threaded screw.

In accordance with the concept of the invention, the sleeve is formed by spirally winding a metal strip of suitable springiness and gauge.

More specifically, the sleeve as best shown in FIG. 1 is formed by spirally winding a blank 12 as shown in FIG. 4. In order to achieve the desired flexibility, 2-4 turns are generally used in rolling the sleeve. The left-hand edge of the blank is formed with teeth 13, the shape of which corresponds to the thread form of the screw. Moving from left toward the right the blank has three steps, 14, 15 and 16. Rows of teeth 17, 18 and 19 are provided along the edges leading from one step to the next one and also leading to the lower right corner of the blank. A flange 20 provided along the bottom edge of the blank includes two cut-outs 21 and 22. A chamfer 23 at the free end of each of the rows of teeths 17, 18 and 19 facilitates insertion of the anchor sleeve in a mounting hole, as will be more fully apparent from the subsequent description. For the same purpose, teeth 13a at the entry end of the row of thread teeth 13 are shorter than the other teeth to facilitate entry of the screw into the sleeve.

To form the sleeve, the row of thread teeth 13 is bent upwards along lines 24. Subsequently, the blank is spirally rolled starting with the lefthand edge thereof. In rolling, terminal flange 20 is formed, thereby obtaining the sleeve shown in FIG. 1.

As indicated in FIG. 4 by dashed lines 25, 26 and 27, the three rows of teeth 17, 18 and 19 are bent off to form the projections shown in FIG. 2, thereby causing the rows of teeth on the outside of the sleeve to protrude tangentially from the generally cylindrical body thereof. The row of thread teeth 13 protrude into the interior of the sleeve for coaction with screw 11, as will be more fully explained hereinafter.

In the rolling and forming process, the end portion 12a of the sleeve is preferably chamfered to facilitate entry of the sleeve into the mounting hole.

It should be pointed out that instead of three circumferentially spaced rows of teeth 17, 18 and 19 more or less such rows may be provided, according to the length of the fasteners. In a very short fastener according to the invention, especially in a fastener intended as a thread insert, one single row is sufficient. It is only essential that such protrusions project tangentially from the outside of the finished sleeve, and that the sleeve is wound in opposite direction of the thread of the coacting screw.

The course screw threads are preferably reduced in amplitude toward the tip of the screw to facilitate insertion thereof into the sleeve. The outer diameter and the pitch of the threads must be so that the same are capable of coacting with the incomplete threads formed by teeth 13 and the diameter of the full size teeth 30 must be such that it is larger than the inner diameter of the sleeve, thereby applying an outwardly directed expansion force to the sleeve when the bolt is threaded into the sleeve. The expansion which takes place is not a localized deformation of the sleeve along the line of pressure. Since the sleeve consists of several turns of thin springy metal, pressure from the inside has the effect of unrolling the sleeve circumferentially and thereby increasing its diameter. This characteristic expansion action can be amplified by bending the row of thread teeth in such a manner that the tips of the thread teeth form a slight angle to the axis of the sleeve. The teeth at the flared entry end of the sleeve are therefore lower than those at the other end. The result is that the expansion pressure increases as the screw enters deeper into the sleeve.

Referring now to FIG. 3, sleeve 10 is inserted into the mounting hole 35 shown as a blind mounting hole formed in a concrete wall 36. The diameter of this hole is not as critical as with other wall anchors, but must be smaller than the maximal diameter of the sleeve as determined by the tangential projections 17, 18 and 19. These projections have smooth, gradual lead-in sections 23 which help to compress the projections during insertion. If the fit is very tight, the sleeve is twisted slightly in anti-clockwise direction. This movement flattens the projections and facilitates insertion. When screw 11 is now threaded into the sleeve, its turning torque will impart a clockwise turning motion to the sleeve. As a result, the tangential projections 17, 18 and 19 dig into the hole wall and counteract the turning torque. As soon as this initial grip has taken hold, continued turning of the screw expands the sleeve. When the tightening is finished, the body of the expanded sleeve is pressed firmly against the inside walls of the hole, if the material permits penetration, the tangential projections have buried themselves in small cavities which they have cut during the tightening process. This feature is of special importance for soft materials such as plaster where expansion alone cannot secure fastener sleeve against pull. The screw or bolt itself can not be pulled out of the hole but only removed therefrom by unscrewing. Since the springy sleeve pressed tightly against the inserted screw over its whole length, it is secured against involuntary loosening, especially under conditions where vibration is present.

Turning now to FIGS. 5, 6 and 7, the fastener as shown in these figures is similar in principle to the fastener as has been described in connection with FIG. 1 to 4 except that the internal threads 13 are replaced by cut-outs 40 which are formed in the inner end portion 12b of the blank from which the sleeve is wound, as has been described in detail in connection with FIG. 4. Portion 12b of the blank is slightly curved so as to form a raised ridge inside the sleeve, as can best be seen in FIG. 5, and the cut-outs are slanted with reference to the lengthwise axis of the sleeve, as can best be seen in FIG. 6. The slant and the spacing of the cut-outs are such that the same constitute incomplete threads coacting with the thread turns 30 of the screw in the same manner as the teeth 13 coact with these threads, as it is best shown in FIG. 7.

While the punched teeth 13 are intended for coaction with coarse screw threads, the slanted cut-outs 40 are more suitable for finer threads. They are used for fasteners with metal screw threads, and are also preferable if the material from which the sleeve is rolled is not sufficiently strong to form efficient punched teeth of the type shown in FIG. 4. The partial thread form shown in FIGS. 5 and 7 has the additional advantage that several raised ridges 12b carrying slanted cut-outs can be provided inside the sleeve. This improves the action of the partial thread and increases the pressure which the screw can exercise.

If the fastener is to be used as a hollow wall anchor in a wall panel of small depth, the initial grip is furnished only by the uppermost tangential projection 19. Generally, the lower projections 17 and 18 will protrude from the rear of the panel and will therefore be ineffective. They can therefore be omitted. Likewise, only the expansion of the upper portion of the sleeve will produce locking action. However, the projecting portion of the sleeve which is now not confined, as it would be in a blind hole, tends to open up and to form a cone which reinforces the locking action by forming an enlargement on the rear side of the wall panel. It is therefore essential for such hollow wall anchors that they be made from thin stock which deforms easily.

Instead of using a threaded bolt such a screw 11, a grooved anchor bolt such as anchor bolt 45 shown in FIG. 8 may also be used. Bolt 45 is a headed bolt with a shank 46 in which are formed several lengthwise spaced apart circumferential ridges 47. The end portion 48 of the bolt is preferably tapered to facilitate the entry thereof into the anchor sleeve. The bolt is installed by forcibly driving rather than screwing into the sleeve. The maximal peripheral outline of ridges 47 on the shank is such that they will cause circumferential expansion of the sleeve for locking the sleeve in its mounting opening, as previously explained. The ridges or at least some of them will eventually lodge themselves either in teeth 13 of the sleeve of FIG. 3, or in the cut-outs 40 of the sleeve of FIG. 7. A roughly knurled anchor bolt in coaction with the fastener sleeve will serve the same purpose. Hammer-driven bolts are used in installations where fast operation is the paramount requirement and more important than the attainment of very high tensile resistance.

It has been explained in the foregoing that a slight counter-clockwise twist of the sleeve will ease insertion of the bolt or sleeve by temporarily reducing its effective diameter and flattening the tangential projections. This feature can be used also to remove an installed fastener, by twisting it in counter-clockwise direction and simultaneously applying withdrawal pull. Removal of an installed wall anchor without chiselling it out of the wall can be very useful under certain given conditions. To facilitate the required twisting operation, the flange 20 of the sleeve is provided with two cut-outs 21 and 22, which a suitable wrench can engage. The two cut-outs may be shaped differently, as shown in FIG. 1. This is a directional indication which makes it possible to determine from the outside the position of the tangential locking projections. In certain applications, it is useful to determine the precise location inside the mounting hole where the projections dig in.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An expansion fastener for mounting in a mounting hole of a support member, said fastener comprising:

an elongate anchor sleeve formed of a spirally wound strip made of springy material, the outer end of said strip extending outwardly from the outer peripheral wall of the sleeve substantially tangentially thereto and in opposition to the winding direction of the strip, the edge of said outer strip end being toothed, said toothed edge including portions disposed in axially and circumferentially staggered relationship on said peripheral outer wall, the inner end of said strip having substantially across the width thereof a radially inwardly protruding portion defining a lengthwise row of incomplete screw threads on the inner sleeve wall, said row of threads being upwardly slanted with reference to the center axis of the sleeve from one sleeve end toward the other, said one end of the sleeve being the leading end thereof and the other the trailing end, said leading end of the sleeve being inwardly tapered to facilitate insertion of the sleeve into the mounting hole; and an anchor bolt having a spirally threaded shank, the outer circumference of the threads on the shank gradually increasing from the tip of the shank toward the other end thereof, the maximal outer circumference of said shank threads being larger than the circumference defined by the incomplete threads at the trailing end of the sleeve, whereby upon insertion of the leading sleeve end into the mounting hole and threading of the bolt shank into the sleeve from the trailing end thereof the resulting outwardly directed radial pressure by the shank threads against the incomplete threads causes a substantially uniform circumferential expansion of the sleeve along the entire length thereof, said circumferential expansion of the sleeve causing pressure engagement of the toothed edge on the outside of the sleeve with the wall of the mounting hole thus locking the sleeve in a rotationally fixed position in the hole, and the coaction of the incomplete threads and the shank threads preventing axial displacement of the bolt relative to the sleeve.

2. The expansion fastener according to claim 1 wherein the direction of the spiral winding of the sleeve and the hand of the screw thread on the bolt shank are in opposition.

3. The expansion fastener according to claim 1 wherein said inwardly protruding portion at the inner end of the strip is an inwardly bent strip portion toothed at its free edge, said toothed edge constituting said incomplete threads on the inner wall of the sleeve.

4. The expansion fastener according to claim 1 wherein said inwardly protruding portion comprises an axially elongate portion of the strip defining part of the inner wall of the sleeve and raised with reference to the underlying strip material, said raised strip portion including slots slanted with reference to the sleeve axis, said slots defining said incomplete threads on the inner sleeve wall.

5. The expansion fastener according to claim 1 and comprising means on the anchor sleeve adjacent to the trailing end thereof for rewinding the sleeve from its circumferentially expanded configuration to substantially its non-expanded configuration for withdrawing the sleeve from the mounting hole after removal of the bolt from the sleeve, said means comprising an outwardly extending peripheral flange at the trailing end of the sleeve, said flange including a cut-out for insertion of a rewinding tool.

6. The expansion fastener according to claim 1 wherein said outwardly extending outer strip end terminates in a stepped edge defining steps extending lengthwise of the sleeve, the edges of said steps being toothed.

* * * * *